United States Patent [19]
Le-Khac et al.

[11] Patent Number: 6,028,230
[45] Date of Patent: Feb. 22, 2000

[54] EPOXIDE POLYMERIZATION PROCESS

[75] Inventors: Bi Le-Khac, West Chester; Ulrich B. Holeschovsky, Chester Springs; Michael A. Rueter, Norristown, all of Pa.

[73] Assignee: Arco Chemical Technology, L.P., Greenville, Del.

[21] Appl. No.: 09/092,471

[22] Filed: Jun. 5, 1998

[51] Int. Cl.⁷ .................................................. C07C 41/03
[52] U.S. Cl. .......................... 568/679; 502/175; 562/572; 568/476; 568/479; 568/623
[58] Field of Search .................... 568/623, 679, 568/476, 479; 502/175; 562/572

[56] References Cited

U.S. PATENT DOCUMENTS

| | | | |
|---|---|---|---|
| 3,404,109 | 10/1968 | Milgrom | 260/611 |
| 3,829,505 | 8/1974 | Herold | 260/611 |
| 4,472,560 | 9/1984 | Kuyper et al. | 526/120 |
| 4,477,589 | 10/1984 | van der Hulst et al. | 502/169 |
| 5,470,813 | 11/1995 | Le-Khac | 502/175 |
| 5,482,908 | 1/1996 | Le-Khac | 502/156 |
| 5,545,601 | 8/1996 | Le-Khac | 502/156 |
| 5,627,122 | 5/1997 | Le-Khac | 502/175 |
| 5,689,012 | 11/1997 | Pazos et al. | 568/619 |
| 5,712,216 | 1/1998 | Le-Khac et al. | 502/175 |
| 5,777,177 | 7/1998 | Pazos | 568/679 |

FOREIGN PATENT DOCUMENTS

| | | |
|---|---|---|
| 2-265922 | of 1989 | Japan . |
| H4-351632 | of 1992 | Japan . |
| H6-248068 | of 1994 | Japan . |

OTHER PUBLICATIONS

Livigni et al., "Poly(Propylene Ether) Polyols Prepared With a Zinc Hexacyanocobaltate Complex Catalyst," *ACS Symposium Series*, No. 6, pp. 20–37 (1975).

Kuyper et al., "Hexacyanometallate Salts Used as Alkene–Oxide Polymerization Catalysts and Molecular Sieves", *J. Catalysis, 105*, pp. 163–174 (1987).

Herold et al., "Hexacyanometalate Salt Complexes as Catalysts for Epoxide Polymerizations", *Advances in Chemistry Series*, No. 128 (Polymerization Kinetics and Technology), pp. 208–229 (1973).

*Primary Examiner*—Elli Peselev
*Attorney, Agent, or Firm*—Stephen D. Harper

[57] ABSTRACT

The amount of high molecular weight impurity present in a polyether polyol produced by alkoxylation of an active hydrogen-containing initiator using an epoxide such as propylene oxide and a substantially amorphous highly active double metal cyanide complex catalyst may be advantageously lowered by having a non-protic Lewis acid present during the epoxide polymerization. The use of halides such as zinc chloride and aluminum chloride is especially effective for such purposes. In a preferred embodiment, minor amounts of water are also present during polymerization. The higher purity polyether polyols thereby produced are particularly useful in the preparation of slab and molded polyurethane foams, which tend to collapse or become excessively tight when elevated levels of high molecular tail are present in the polyether polyol.

21 Claims, No Drawings

EPOXIDE POLYMERIZATION PROCESS

FIELD OF THE INVENTION

The present invention pertains to an improved method of polymerizing epoxides using a highly active substantially amorphous double metal cyanide complex catalyst whereby the polyether polyol obtained has enhanced processing latitude in preparing molded and slab polyurethane foam. More particularly, the invention relates to the use of non-protic Lewis acids (preferably in combination with water) during epoxide polymerization to desirably reduce the high molecular tail content of the resulting polyether polyol.

BACKGROUND OF THE INVENTION

Polyurethane polymers are prepared by reacting a di- or polyisocyanate with a polyfunctional, isocyanate-reactive compound, in particular, hydroxyl-functional polyether polyols. Numerous art-recognized classes of polyurethane polymers exist, for example cast elastomers, polyurethane RIM, microcellular elastomers, and molded and slab polyurethane foam. Each of these varieties of polyurethanes present unique problems in formulation and processing.

Two of the highest volume categories of polyurethane polymers are polyurethane molded and slab foam. In slab foam, the reactive ingredients are supplied onto a moving conveyor and allowed to rise freely. The resulting foam slab, often 6 to 8 feet (2 to 2.6 m) wide and high, may be sliced into thinner sections for use as seat cushions, carpet underlay, and other applications. Molded foam may be used for contoured foam parts, for example, cushions for automotive seating.

In the past, the polyoxypropylene polyether polyols useful for slab and molded foam applications have been prepared by the base-catalyzed propoxylation of suitable hydric initiators such as propylene glycol, glycerine, sorbitol, etc., producing the respective polyoxypropylene diols, triols, and hexols. As is now well documented, a rearrangement of propylene oxide to allyl alcohol occurs during base-catalyzed propoxylation. The monofunctional, unsaturated allyl alcohol bears a hydroxyl group capable of reaction with propylene oxide, and its continued generation and propoxylation produces increasingly large amount of unsaturated polyoxypropylene monols having a broad molecular weight distribution. As a result, the actual functionality of the polyether polyols produced is lowered significantly from the "normal" or "theoretical" functionality. Moreover, the monol generation places a relatively low practical limit on the molecular weight obtainable. For example, a base catalyzed 4000 Da (Dalton) molecular weight (2000 Da equivalent weight) diol may have a measured unsaturation of 0.05 meq/g, and will thus contain 30 mol percent unsaturated polyoxypropylene monol species. The resulting actual functionality will be only 1.7 rather than the "nominal" functionality of 2 expected for a polyoxypropylene diol. As this problem becomes even more severe as molecular weight increases, preparation of polyoxypropylene polyols having equivalent weights higher than about 2200–2300 Da is impractical using conventional base catalysis.

Double metal cyanide ("DMC") complex catalysts such as zinc hexacyanocobaltate complexes were found to be catalysts for propoxylation about 30 years ago. However, their high cost, coupled with modest activity and the difficulty of removing significant quantities of catalyst residues from the polyether product, hindered commercialization. The unsaturation level of polyoxyproylene polyols produced by these catalysts was found to be low, however.

The relatively modest polymerization activity of these conventional double metal cyanide-complex catalysts has been recognized as a problem by workers in the field.

Recently, as indicated by U.S. Pat. Nos. 5,470,813, 5,482, 908, 5,545,601, and 5,712,216, researchers at ARCO Chemical Company have produced substantially amorphous DMC complex catalysts with exceptional activity, which have also been found to be capable of producing polyether polyols having unsaturation levels in the range of 0.002 to 0.007 meq/g (levels previously obtainable only through the use of certain solvents such as tetrahydrofuran). The polyoxypropylene polyols thus prepared were found to react in a quantitatively different manner from prior "low" unsaturation polyols in certain applications, notably cast elastomers and microcellular foams. However, substitution of such polyols for their base-catalyzed analogs in molded and slab foam formulations is not straightforward. In molded foams, for example, foam tightness increases to such an extent that the necessary crushing of the foams following molding is difficult if not impossible. In both molded foams and slab foams, foam collapse often occurs, rendering such foams incapable of production. These effects occur even when the high actual functionality of such polyols is purposefully lowered by addition of lower functionality polyols to achieve an actual functionality similar to that of base-catalyzed polyols.

DMC-catalyzed polyoxypropylene polyols have exceptionally narrow molecular weight distribution, as can be seen from viewing gel permeation chromatograms of polyol samples. The molecular weight distribution is often far more narrow than analogous base-catalyzed polyols, particularly in the higher equivalent weight range, for example. Polydispersities less than 1.5 are generally obtained, and polydispersities in the range of 1.05 to 1.15 are common. In view of the low levels of unsaturation and low polydispersity, it was surprising that DMC-catalyzed polyols did not prove to be "drop-in" replacements for base-catalyzed polyols in polyurethane foam applications. Because propoxylation with modern DMC catalysts is highly efficient, it would be very desirable to be able to produce DMC-catalyzed polyoxypropylene polyols which can be used in slab and molded polyurethane foam applications without causing excessive foam tightness or foam collapse.

SUMMARY OF THE INVENTION

It has now been surprisingly discovered that polyether polyols which contain polymerized propylene oxide and which mimic the behavior of based-catalyzed analogs in slab and molded polyurethane foams may be obtained using highly active substantially amorphous double metal cyanide complex catalysts if, during the polymerization of the propylene oxide, effective amounts of one or more non-protic Lewis acids are present during polymerization. The reduction in the amount of high molecular weight tail impurity in the polyether polyol may be further enhanced by using water in combination with the Lewis acid.

The beneficial effect of having a non-protic Lewis acid present during polymerization was unexpected in view of the disclosure of Japanese Kokai No. 2-265922. This laid-open Japanese patent application teaches that adding a Lewis acid treating agent to a polyether prepared by a ring-opening reaction in the presence of a compound metal cyanide complex catalyst will deactivate the catalyst. Contrary to this teaching, Applicants have found that non-protic Lewis acids, if used in relatively minor amounts, will not significantly decrease the polymerization rate yet will effectively suppress the generation of the high molecular weight tail impurities responsible for foam collapse.

DETAILED DESCRIPTION OF THE INVENTION

Intensive research into the chemical and physical characteristics of polyoxypropylene polyols has led to the discovery that despite the narrow molecular weight distribution and low polydispersities of polyols catalyzed by substantially amorphous highly active double metal cyanide complex catalysts, small high molecular weight fractions are responsible in large part for excessive foam tightness (stabilization) and foam collapse.

A comparison of gel permeation chromatograms of base-catalyzed and DMC-catalyzed polyols exhibit significant differences. For example, a base-catalyzed polyol exhibits a significant "lead" portion of low molecular weight oligomers and polyoxypropylene monols prior to the main molecular weight peak. Past the peak, the weight percentage of higher molecular weight species falls off rapidly. A similar chromatogram of a DMC-catalyzed polyol reveals a tightly centered peak with very little low molecular weight "lead" portion, but with a higher molecular weight portion (high molecular weight "tail") which shows the presence of measurable species at very high molecular weights. Due to the low concentration of these species, generally less than 2–3 weight percent of the total, the polydispersity is low. However, intensive research has revealed that the higher molecular weight species, despite their low concentrations, are largely responsible for the abnormal behavior of DMC-catalyzed polyols in molded and slab polyurethane foam applications. It is surmised that these high molecular weight species exert a surfactant-like effect which alters the solubility and hence the phaseout of the growing polyurethane polymers during the isocyanate-polyol reaction.

By fractionation and other techniques, it has been determined that the high molecular weight tail may be divided into two molecular weight fractions based on the different effects these fractions influence. The first fraction, termed herein "intermediate molecular weight tail," consists of polymeric molecules having molecular weights ranging from about 20,000 Da to 400,000 Da, and greatly alters the foam tightness in molded foam and high resilience (HR) slab foam. A yet higher molecular weight fraction (hereinafter, "ultra-high molecular weight tail") dramatically influences foam collapse both in molded foam and in slab foam of both conventional and high resilience (HR) varieties.

Thus far, no completely effective method of avoiding production of high molecular weight tail during propoxylation employing DMC complex catalysts has been known in the art. Use of processes such as continuous addition of starter in both batch and continuous polyol preparation, as disclosed in WO 97/29146 and U.S. Pat. No. 5,689,012, have proven partially effective in lowering the amount of high molecular weight tail in some cases. However, the portion which remains is still higher than is optimal if the polyether polyol is to be used for preparation of polyurethane foam. Commercially acceptable methods for removing or destroying high molecular weight tail have also not been developed. Destruction of high molecular weight species by cleavage induced by peroxides is somewhat effective, but also cleaves the desired molecular weight species as well. Fractionation with supercritical $CO_2$ is effective with some polyols but not others, and is too expensive to be commercially acceptable.

It has unexpectedly been found that the problem of reducing the high molecular tail in a polyether polyol obtained using a substantially amorphous highly active double metal cyanide complex catalyst may be readily solved by having an effective amount of a non-protic Lewis acid present during the alkoxylation reaction. A Lewis acid is any molecule or ion (often referred to as an electrophile) capable of combining with another molecule or ion by forming a covalent bond with two electrons from the second molecule or ion. A Lewis acid thus is an electron acceptor. The term "non-protic" as used herein refers to Lewis acids other than substances capable of functioning as a source of a proton (H+).

In one embodiment of the invention, the Lewis acid selected is soluble in the polyether polyol produced. However, insoluble non-protic Lewis acids, including Lewis acids which are supported or otherwise immobilized on an insoluble matrix, could also be utilized if so desired. Particularly preferred Lewis acids for purposes of this invention include halides (i.e., fluorides, chlorides, bromides, iodides) of elements selected from the group consisting of aluminum, manganese, iron, cobalt and zinc and the like. Halides of other elements including, for example, boron, iron, titanium, tin, chromium, magnesium, vanadium, hafnium, zirconium and the like may also be used. The Lewis acid may contain substituents other than halide groups. Specific examples of suitable Lewis acids include, but are not limited to, zinc chloride, zinc bromide, zinc fluoride, aluminum trichloride, aluminum tribromide, aluminum trifluoride, stannous chloride, stannous bromide, ferric chloride, ferrous chloride, boron trifluoride, magnesium chloride, manganous chloride, cobaltous chloride, and the like and mixtures thereof.

The amount of non-protic Lewis acid should be sufficient to reduce the amount of high molecular weight tail in the polyether polyol to the desired extent. At the same time, however, the use of excessive amounts of Lewis acid generally should be avoided in order to maintain relatively high catalytic activity. Typically, the quantity of Lewis acid present during polymerization is adjusted such that the activity of the double metal cyanide complex catalyst as measured by the weight of epoxide reacted per unit of time at a given temperature does not decrease more than 20% as compared to the catalyst activity under the same conditions in the absence of Lewis acid. Generally speaking, it will be desirable to employ an amount of Lewis acid effective to render the performance of the polyether polyol product in a Supercritical Foam Test or Tightness Foam Test more similar (preferably, substantially similar) to that of an analogous polyether polyol made by conventional KOH-catalyzed polymerization than would have been the case in the absence of the Lewis acid. The optimum quantity will, of course, vary depending upon the Lewis acid selected, the polymerization conditions and the composition, amount and activity of the double metal cyanide complex catalyst, among other factors, but may be readily determined by routine experimentation. Typically, the Lewis acid is utilized in an amount which is from 0.1 to 200 parts per million by weight based on the weight of the polyether polyol to be prepared (which typically is equal to the combined weight of epoxide(s) and initiator). Lewis acid concentrations in the range of from 0.5 to 50 parts per million are generally preferred, particularly when the catalyst concentration is in the range of 5 to 50 ppm. It will often be advantageous to utilize a Lewis acid:catalyst weight ratio in the range of about 0.1 to 1.0. The Lewis acid may most conveniently be charged all at once to the polymerization reactor together with the initiator and double metal cyanide complex catalyst prior to introduction of the epoxide and initiation of the polymerization. If so desired, the Lewis acid and the catalyst may be premixed or otherwise combined before charging to the reactor.

In a particularly preferred embodiment of the invention, water is also present during the double metal cyanide complex-catalyzed epoxide polymerization. The presence of water, for reasons which are not well understood, seems to greatly increase the efficiency of the Lewis acid and also to improve the reproducibility of the results obtained. That is, the amount of high molecular tail impurity produced and the batch-to-batch variation in the amount of this impurity are generally much lower when water is present together with Lewis acid than when water is rigorously excluded. The amount of water is not believed to be critical, but is sufficiently high that the desired reduction in high molecular weight tail or improvement in reproducibility is achieved. As water can act as an initiator for polymerization, thereby generating difunctional polyoxyalkylene glycol species, the use of excessive amounts of water should generally be avoided where a polyether polyol having a functionality different from two (e.g., a triol) is the desired product. If a difunctional polyether polyol is desired, the amount of water utilized should be taken into account when calculating the quantity of difunctional initiator needed to achieve a given molecular weight during polymerization. Relatively high levels of water can also deactivate the catalyst or interfere with facile catalyst activation. The optimum amount of water may be readily determined by routine experimentation, but will typically be in the range of from about 1 to 500 parts per million by weight based on the weight of polyether polyol. When zinc chloride is used as the Lewis acid at a level of 5 to 25 parts per million by weight of polyether polyol and the double metal cyanide complex catalyst is present at a level of 20 to 40 parts per million by weight of polyether polyol, the amount of water present is preferably from about 5 to 100 parts per million. Those skilled in the art will recognize that the catalysts, initiators, solvents and Lewis acids utilized in the present process will often contain water as an impurity (unless rigorously excluded) in amounts sufficient to improve the effectiveness of the Lewis acid as described hereinabove. Water may also, of course, be introduced separately from or in addition to these reaction components.

The double metal cyanide catalysts to be used in combination with the Lewis acid are substantially amorphous (meaning no intense, sharp peaks are visible in an x-ray diffraction pattern of the catalyst) and are comprised of a double metal cyanide, an organic complexing agent and a metal salt. The catalyst has very high polymerization activity; i.e., it is capable of polymerizing propylene oxide at a rate in excess of 3 g (more preferably, 5 g) propylene oxide per minute per 250 ppm catalyst (based on the combined weight of initiator and propylene oxide) at 105° C. Double metal cyanide complex catalysts meeting these requirements and methods for their preparation are described in detail in U.S. Pat. Nos. 5,470,813, 5,482,908, 5,545,601, and 5,712,216, each of which is incorporated herein by reference in its entirety.

The double metal cyanide most preferably is zinc hexacyanocobaltate, while the metal salt (used in excess in the reaction to form the double metal cyanide) is preferably selected from the group consisting of zinc halides (zinc chloride being especially preferred), zinc sulphate and zinc nitrate. It is believed that the metal salt in the catalyst is not present as free metal salt, but is in some way closely associated or complexed with the double metal cyanide matrix of the catalyst. The metal salt contained in the catalyst may, in certain embodiments of the invention, have the same chemical identity as the non-protic Lewis acid introduced during polymerization. For example, the metal salt and the Lewis acid may both be zinc chloride. However, for reasons which are not well understood, modifying the catalyst synthesis to retain a higher level of residual zinc chloride in the isolated catalyst does not tend to suppress the formation of high molecular tail as effectively as adding the zinc chloride directly to the polymerization reaction mixture. Thus, in a preferred embodiment of the invention, the non-protic Lewis acid is introduced separately from the double metal cyanide complex catalyst.

The organic complexing agent is desirably selected from the group consisting of alcohols, ethers and mixtures hereof, with water soluble aliphatic alcohols such as tert-butyl alcohol being particularly preferred. The double metal cyanide complex catalyst is desirably modified with a polyether, as described in U.S. Pat. Nos. 5,482,908 and 5,545,601.

The catalyst concentration is generally selected such that sufficient catalyst is present to polymerize the epoxide at a desired rate or within a desired period of time. It is desirable to minimize the amount of catalyst employed, both for economic reasons and to avoid having to remove the catalyst from the polyether polyol produced. The activities of the catalysts utilized in the present process are extremely high; catalyst concentrations in the range of from 5 to 50 parts per million based on the combined weight of active hydrogen-containing initiator and epoxide thus are typically sufficient.

The process of this invention is particularly useful for polymerizing propylene oxide alone since propylene oxide homopolymerization is particularly apt to form undesirably high levels of high molecular weight tail. However, the process may also be employed to polymerize other epoxides such as ethylene oxide, 1-butene oxide and the like either alone or in combination with other epoxides. For examples, copolymers of ethylene oxide and propylene oxide may be produced.

The active hydrogen-containing initiator may be any of the substances known in the art to be capable of alkoxylation by epoxide using a double metal cyanide complex catalyst and is selected based on the desired functionality and molecular weight of the polyether polyol product. Typically, the initiator (which may also be referred to as "starter") will be oligomeric in character and have a number average molecular weight in the range of from 100 to 1000 and a functionality (number of active hydrogens per molecule) of from 2 to 8. Alcohols (i.e., organic compounds containing one or more hydroxy groups) are particularly preferred for use as initiators.

The polymerization may be conducted using any of the alkoxylation procedures known in the double metal cyanide complex catalyst art. For instance, a conventional batch process may be employed wherein the catalyst, Lewis acid and initiator are introduced into a batch reactor. The reactor is then heated to the desired temperature (e.g., 70 to 150° C.) and an initial portion of epoxide introduced. Once the catalyst has been activated, as indicated by a drop in pressure and consumption of the initial epoxide charge, the remainder of the epoxide is added incrementally with good mixing of the reactor contents and reacted until the desired molecular weight of the polyether polyol product is achieved. The Lewis acid is then removed from the polyether polyol by means of adsorption, ion exchange or the like, if so desired. Alternatively, the Lewis acid may be left in the polyether polyol since it is not expected to interfere with the performance of the polyether polyol in many end-use applications, particularly if present at relatively low levels. The initiators, monomers and polymerization conditions described in U.S. Pat. No. 3,829,505 (incorporated herein by reference in its entirety) may be readily adapted for use in the present process.

Although it is highly desirable to have the Lewis acid present during initiation (catalyst activation), in an alternative embodiment of the invention the Lewis acid is added after initiation. Additional portions of Lewis acid may also be introduced as the polymerization is taking place (e.g., during addition of the epoxide(s)).

Alternatively, a conventional continuous process may be employed whereby a previously activated initiator/catalyst/ Lewis acid mixture is continuously fed into a continuous reactor such as a continuously stirred tank reactor (CSTR) or tubular reactor. A feed of epoxide is introduced into the reactor and the product continuously removed. The process of this invention may also be readily adapted for use in continuous addition of starter (initiator) processes, either batch or continuous operation, such as those described in detail in U.S. application Ser. No. 08/597,781, filed Feb. 7, 1996, now U.S. Pat. No. 5,777,177, and U.S. Pat. No. 5,689,012, both of which are incorporated herein by reference in their entirety.

The polyether polyols produced by operation of the process of the invention preferably have functionalities, molecular weights and hydroxyl numbers suitable for use in molded and slab foams. Nominal functionalities range generally from 2 to 8. In general, the average functionality of polyether polyol blends ranges from about 2.5 to 4.0. The polyether polyol equivalent weights generally range from somewhat lower than 1000 Da to about 5000 Da. Unsaturation is preferably 0.025 meq/g or lower. Hydroxyl numbers preferably range from 10 to about 80. Blends may, of course, contain polyols of both lower and higher functionality, equivalent weight, and hydroxyl number.

The performance of polyether polyols may be assessed by testing these polyether polyols in the "Tightness Foam Test" (TFT) and "Super Critical Foam Test" (SCFT). Polyether polyols which pass these tests have been found to perform well in commercial slab and molded foam applications, without excessive tightness, and without foam collapse. The SCFT consists of preparing a polyurethane foam using a formulation which is expressly designed to magnify differences in polyether polyol behavior.

In the SCFT, a foam prepared from a given polyether polyol is reported as "settled" if the foam surface appears convex after blow-off and is reported as collapsed if the foam surface is concave after blow-off. The amount of collapse can be reported in a relatively quantitative manner by calculating the percentage change in a cross-sectional area taken across the foam. The foam formulation is as follows: polyether polyol, 100 parts; water, 6.5 parts; methylene chloride, 15 parts; Niax® A-1 amine-type catalyst, 0.10 parts; T-9 tin catalyst, 0.34 parts; L-550 silicone surfactant, 0.5 parts. The foam is reacted with a mixture of 80/20 2,4 and 2,6-toluene diisocyanate at an index of 110. The foam may be conveniently poured into a standard 1 cubic foot cake box, or a standard 1 gallon ice cream container. In this formulation, conventionally prepared, i.e., base catalyzed polyether polyols having high secondary hydroxyl cause the foam to settle approximately 10–20%, generally 15%±3%, whereas polyether polyols prepared from DMC catalysts containing unacceptably high levels of high molecular weight tail cause the foam to collapse by approximately 35–70%.

While the SCFT is used to assess differences in foam stability, the Tightness Foam Test (TFT) magnifies reactivity differences, as reflected by foam porosity. In the tightness foam test, the resin component consists of 100 parts polyether polyol, 3.2 parts water (reactive blowing agent), 0.165 parts C-183 amine catalyst, 0.275 parts T-9 tin catalyst, and 0.7 parts L-620 silicone surfactant. The resin component is reacted with 80/20 toluene diisocyanate at an index of 105. Foam tightness is assessed by measuring air flow in the conventional manner. Tight foams have reduced air flow.

The analytical procedure useful for measuring the quantity of high molecular weight tail in a given DMC-catalyzed polyether polyol is a conventional HPLC technique, which can easily be developed by one skilled in the art. The molecular weight of the high molecular weight fraction may be estimated by comparing its elution time in the GPC column with that of a polystyrene standard of appropriate molecular weight. As is well known, high molecular weight fractions elute from a GPC column more rapidly than lower molecular weight fractions, and to aid in maintaining a stable baseline, it is appropriate, following the elution of the high molecular weight fraction, to divert the remainder of the HPLC eluate to waste, rather than allowing it to pass through the detector, overloading the latter. Although many suitable detectors may be utilized, a convenient detector is an evaporative light scattering detector (ELSD) such as those commercially available.

In the preferred analysis method, a Jordi Gel DVB $10^3$ Angstrom column, 10×250 mm, 5 micron particle size, is employed with a mobile phase which consists of tetrahydrofuran. The detector used is a Varex Model IIA evaporative light scattering detector. Polystyrene stock solutions are made from polystyrenes of different molecular weights by appropriate dilution with tetrahydrofuran, to form standards containing 2, 5, and 10 mg/L of polystyrene.

Samples are prepared by weighing 0.1 gram of polyether polyol into a 1 ounce bottle, and adding tetrahydrofuran to the sample to bring the total weight of sample and tetrahydrofuran to 10.0 grams. Samples of the 2, 5, and 10 mg/L polystyrene calibration solutions are sequentially injected into the GPC column. Duplicates of each polyether polyol sample solution are then injected, following by a reinjection of the various polystyrene standards. The peak areas for the polystyrene standards are electronically integrated, and the electronically integrated peaks for the two sets of each candidate polyol are electronically integrated and averaged. Calculation of the high molecular weight tail in ppm is then performed by standard data manipulation techniques.

Having generally described this invention, a further understanding can be obtained by reference to certain specific examples which are provided herein for purposes of illustration only and are not intended to be limiting unless otherwise specified.

EXAMPLES

A series of epoxide polymerizations was performed using a semi-batch reactor having a nominal 1-liter volume. A base charge of 167 g of trifunctional polyether polyol having a hydroxyl number of 240 mg KOH/g was added to the reactor in each run to serve as the initiator (starter). A double metal cyanide complex catalyst comprised of zinc hexacyanocobaltate, tert-butyl alcohol, zinc chloride, and a polyether prepared in accordance with U.S. Pat. No. 5,482,908 was then charged to the reactor. The amount of catalyst used was normally 30 ppm based on the final weight of the polyether polyol product, although other catalyst levels were also evaluated. After catalyst addition, the initiator/catalyst mixture was normally stripped at 130° C. for 30–90 minutes using full vacuum and nitrogen sparge in an attempt to completely remove any water (measurement of the actual amount of water present was not performed). This served to establish a "water-free" baseline for each batch.

Once stripping was completed, zinc chloride ($ZnCl_2$) and water were then added to the reactor. Normally this was accomplished through the use of a pre-mixed aqueous solution of zinc chloride. After addition of the Lewis acid and water, addition of propylene oxide was started. The first portion of propylene oxide added was an initiator charge. Propylene oxide was added until the reactor pressure reached 35 psia. Addition of propylene oxide was then stopped and the reactor pressure monitored. The catalyst was considered "activated" when sufficient epoxide had reacted to bring the pressure down to one-half of its peak volume (i.e., ca. 17.5 psia). Once activated, the propylene oxide feed was restarted at a rate of 6.5 g/min. Continuous epoxide addition was maintained until propylene oxide had been added in an amount sufficient to provide a final polyether polyol having a hydroxyl number of 56 mg KOH/g.

The polyether polyol product was tested by two primary methods. Properties were determined analytically by conventional means, including hydroxyl number, molecular weight distribution (including a quantitative measurement of high molecular weight species), unsaturation and viscosity.

Table I demonstrates the effectiveness of using a combination of zinc chloride and water in reducing the amount of relatively high molecular weight species (>200,000) in the polyether polyol product. When neither water or zinc chloride is added (Example 1), the polyether polyol fails the Supercritical Foam Test with a settle (collapse) much greater than the control polyether polyol processed using KOH catalyst. However, when 5–10 ppm $ZnCl_2$ and 10 ppm added water are present (Examples 2 and 3) the polyether polyol passed the Supercritical Foam Test with performance essentially equivalent to the KOH-catalyzed product. A significant reduction in the level of impurities having molecular weight in excess of 200,000, which are believed to be primarily responsible for causing foam collapse, is observed. Although the amount of intermediate molecular weight (40,000–60,000) species present increases when zinc chloride and water are introduced, these species do not hinder foam performance. When the zinc chloride concentration is too great (Example 4), the catalyst fails to initiate. Therefore, at 30 ppm catalyst under this specific set of polymerization conditions, the useful range of the zinc chloride concentration is approximately 5 to 25 ppm.

TABLE 1

| Example | Catalyst, ppm | $ZnCl_2$, ppm | Added $H_2O$, ppm | 40–60K MW Fraction, ppm | 200–400 K MW Fraction, ppm | >400 K MW Fraction, ppm | Foam Test Results, % Settle | KOH Control Foam Test, % Settle |
|---|---|---|---|---|---|---|---|---|
| 1[1] | 30 | 0 | 0 | 238 | 42 | 7 | 44.2 | 13.9 |
| 2 | 30 | 5 | 10 | 1294 | 16 | 0 | 13.4 | 13 |
| 3 | 30 | 10 | 10 | 1051 | 2 | 0 | 16.3 | 13.9 |
| 4[2] | 30 | 30 | <30 | — | — | — | — | — |

[1]Control (comparative example)
[2]Failed to initiate

Foam performance was evaluated using the Super Critical Foam Test described earlier in the Detailed Description of the Invention section. The extent of foam settling (or collapse) was compared to a control polyether polyol produced using conventional KOH-catalyzed alkoxylation procedures.

The key results are summarized in the following series of tables, each showing the effect of varying a different key process parameter. All concentrations are given in parts per million by weight based on the weight of the final polyether polyol product.

Table 11 demonstrates the effectiveness of using water in combination with zinc chloride. When the amount of water is low (Examples 5 and 6), the foam performance of the polyether polyol is similar to that of the polyether polyol made without added zinc chloride (Example 1). When the water concentration is relatively high (Example 9), the activation of the catalyst is hindered and the polymerization cannot be successfully completed. These results show that under the specific polymerization conditions evaluated, a suitable range for water concentration is approximately 10–45 ppm.

TABLE 2

| Example | Catalyst, ppm | $ZnC_2$, ppm | Added $H_2O$, ppm | 40–60K MW Fraction, ppm | 200–400 K MW Fraction, ppm | >400 K MW Fraction, ppm | Foam Test Results, % Settle | KOH Control Foam Test, % Settle |
|---|---|---|---|---|---|---|---|---|
| 1[1] | 30 | 0 | 0 | 238 | 42 | 7 | 44.2 | 13.9 |
| 5[2] | 30 | 10 | 0 | 353 | 462 | 24 | 37.6 | 15.7 |
| 6 | 30 | 10 | 6.7 | 680 | 21 | 0 | 46.8 | 13.8 |
| 3 | 30 | 10 | 10 | 1051 | 2 | 0 | 16.3 | 13.9 |
| 7 | 30 | 10 | 20 | 1008 | 7 | 0 | 17.2 | 13.9 |
| 8 | 30 | 10 | 30 | 968 | 17 | 6 | 12.3 | 13.8 |
| 9[3] | 30 | 10 | 50 | — | — | — | — | — |

[1]Control (comparative example)
[2]InitiatorlCatalyst mixture stripped under vacuum for 150 minutes after $ZnCl_2$ addition to remove water.
[3]Failed to initiate Table III shows the effect of varying the catalyst concentration relative to the amount of added zinc chloride and water present. The results indicate that an optimal $ZnCl_2$/catalyst ratio exists at each catalyst concentration which yields the greatest reduction in high molecular weight species. When the catalyst concentration is increased from 30 to 45 ppm, a corresponding increase in the amount of zinc chloride and water is sufficient to effectively suppress the formation of high molecular weight species (Examples 3, 10 and 11). Under these polymerization conditions, the preferred $ZnCl_2$/catalyst weight ratio is in the range of 0.2–0.5.

TABLE 3

| Example | Catalyst, ppm | $ZnCl_2$, ppm | Added $H_2O$, ppm | 200–400 K 40–60K MW Fraction, ppm | >400 K MW Fraction, ppm | MW Fraction, ppm | Foam Test Results, % Settle | KOH Control Foam Test, % Settle |
|---|---|---|---|---|---|---|---|---|
| 1[1] | 30 | 0 | 0 | 238 | 42 | 7 | 44.2 | 13.9 |
| 3 | 30 | 10 | 10 | 1051 | 2 | 0 | 16.3 | 13.9 |
| 10 | 30 | 15 | 15 | 942 | 12 | 14 | 11.5 | 13.8 |
| 11 | 45 | 15 | 15 | 617 | 0 | 0 | 11.8 | 13.4 |

[1]Control (comparative example)

Another series of epoxide polymerizations was performed using the same type of double metal cyanide complex catalyst described in the prior examples, wherein the proportion of 240 mg KOH/g hydroxyl number trifunctional polyether polyol initiator relative to propylene oxide was varied in order to obtain a final product having a molecular weight of approximately 3000. Varying amounts of aluminum chloride or zinc chloride were introduced (except in Example 16, which is a comparative run).

In Examples 14–17, the reaction mixtures were stripped under vacuum (at 105° C., except Example 15, which was stripped at 130° C.) before the initial charge of propylene oxide was added. The time required to add the propylene oxide was generally about 120 minutes, although in some cases a longer addition time was needed due to a decreased catalyst activity.

The polyether polyol products thereby obtained were characterized in the same manner as described previously with the key results being summarized in Table 4. Both zinc chloride and aluminum chloride were found to be effective in suppressing the formation of high molecular weight impurities and in improving the foaming properties of the polyether polyol in the Supercritical Foam Test. Other Lewis acids (zinc bromide, zinc acetate, zinc sulfate, ferric chloride, ferrous chloride) were less effective under these conditions.

We claim:

1. An epoxide polymerization process comprising reacting an epoxide and an active hydrogen-containing initiator in the presence of (a) a substantially amorphous highly active double metal cyanide complex catalyst comprised of a double metal cyanide, an organic complexing agent, and a metal salt and (b) an effective amount of a non-protic Lewis acid for a time and at a temperature effective to form a polyether polyol, wherein said polyether polyol contains a reduced level of high molecular weight tail as compared to an analogous polyether polyol prepared in the absence of the non-protic Lewis acid.

2. The process of claim 1 wherein the non-protic Lewis acid is soluble in the polyether polyol.

3. The process of claim 1 wherein the non-protic Lewis acid is a halide.

4. The process of claim 3 wherein the non-protic Lewis acid is a halide of an element selected from the group consisting of Al, Mn, Fe, Co and Zn.

5. The process of claim 1 wherein the Lewis acid is present in an amount of from 0.1 to 200 parts per million by weight of the polyether polyol.

6. The process of claim 1 wherein the double metal cyanide is zinc hexacyanocobaltate.

7. The process of claim 1 wherein the metal salt is selected from the group consisting of zinc halides, zinc nitrate, zinc sulfates, and mixtures thereof.

8. The process of claim 1 wherein the organic complexing agent is a water soluble aliphatic alcohol.

9. The process of claim 1 wherein the polyether polyol has a functionality of 2 to 8 and an equivalent weight of 1000 to 5000.

10. The process of claim 1 wherein the double metal cyanide complex catalyst is additionally comprised of a polyether.

11. The process of claim 1 wherein water is additionally present.

12. A process to produce a polyether polyol comprising reacting an epoxide and an active hydrogen-containing

TABLE 4

| Example | 12 | 13 | 14 | 15 | 16* | 17 |
|---|---|---|---|---|---|---|
| Lewis Acid | $AlCl_3$ | $AlCl_3$ | $AlCl_3$ | $AlCl_3$ | — | $ZnCl_2$ |
| ppm | 10 | 5 | 20 | 20 | — | 10 |
| Hydroxyl Number, mg KOH/g | 55.7 | 55.7 | 57.5 | 56.2 | 56.2 | 56.5 |
| Viscosity, cps (25° C.) | 575 | 558 | 897 | 616 | 566 | 652 |
| Polydispersity(Mw/Mn) | 1.042 | 1.029 | 1.508 | 1.119 | 1.028 | 1.152 |
| >100K Mw Fraction, ppm | 147 | 115 | 85 | 54 | 121 | 20 |
| >400K Mw Fraction, ppm | 6 | 5 | nd | nd | 10 | nd |
| Supercritical Foam Test, % Settle | 23.75 | 13.08 | 14.26 | 12.47 | 30.9 | 9.88 |
| KOH Control Foam Test, % Settle | 12.98 | 10.75 | 10.75 | 10.25 | 11 | 10.25 |

*Control
nd = not detected initiator in the presence of (a) a substantially amorphous zinc hexacyanocobaltate complex catalyst comprised of zinc hexacyanocobaltate, a water soluble aliphatic alcohol and a metal salt, said zinc hexacyanocobaltate complex catalyst being capable of polymerizing propylene oxide at a rate in excess of 5 g propylene oxide per minute per 250 ppm zinc hexacyanocobaltate complex catalyst, based on the combined weight of active hydrogen-containing initiator and propylene oxide, at 105° C., (b) an effective amount of a non-protic Lewis acid selected from the group consisting of halides of zinc, manganese, iron, cobalt, and aluminum and mixtures thereof, and (c) an effective amount of water for a time and at a temperature effective to form the polyether polyol, wherein said polyether polyol contains a reduced level of high molecular weight tail as compared to an analogous polyether polyol prepared in the absence of the non-protic Lewis acid and water.

13. The process of claim 12 wherein the non-protic Lewis acid is selected from the group consisting of zinc chloride, aluminum chloride and mixtures thereof.

14. The process of claim 12 wherein the water soluble aliphatic alcohol is tert-butyl alcohol.

15. The process of claim 12 wherein the non-protic Lewis acid is present in an amount of from 0.1 to 200 parts per million by weight based on the weight of the polyether polyol.

16. The process of claim 12 wherein the metal salt is zinc chloride.

17. The process of claim 12 wherein from 5 to 100 parts per million water is present.

18. The process of claim 12 wherein the epoxide is selected from the group consisting of propylene oxide and mixtures of propylene oxide and ethylene oxide.

19. The process of claim 12 wherein the polyether polyol has a functionality of 2 to 8 and an equivalent weight of 1000 to 5000.

20. The process of claim 12 wherein the temperature is in the range of 70° C. to 150° C.

21. The process of claim 12 wherein the zinc hexacyanocobaltate complex catalyst is present at a concentration of from 5 to 50 parts per million based on the weight of polyether polyol.

* * * * *